United States Patent
Chien et al.

(10) Patent No.: US 11,604,467 B2
(45) Date of Patent: Mar. 14, 2023

(54) METHOD OF CONTROLLING MOTION OF MOBILE WARNING TRIANGLE AND MOBILE WARNING TRIANGLE EMPLOYING METHOD

(71) Applicant: Fulian Precision Electronics (Tianjin) Co., LTD., Tianjin (CN)

(72) Inventors: Yu-Ching Chien, New Taipei (TW); Chuang-Wei Tseng, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 196 days.

(21) Appl. No.: 17/238,823

(22) Filed: Apr. 23, 2021

(65) Prior Publication Data

US 2022/0057801 A1 Feb. 24, 2022

(30) Foreign Application Priority Data

Aug. 21, 2020 (CN) .......................... 202010848566.5

(51) Int. Cl.
    *G05D 1/02* (2020.01)
    *G09F 13/16* (2006.01)

(52) U.S. Cl.
    CPC ......... *G05D 1/0212* (2013.01); *G05D 1/0234* (2013.01); *G05D 1/0246* (2013.01); *G05D 2201/0207* (2013.01); *G05D 2201/0213* (2013.01); *G09F 13/16* (2013.01)

(58) Field of Classification Search
    CPC ......... G05D 1/0212; G05D 2201/0207; G05D 1/0234; G05D 2201/0213; G06V 10/56; G09F 13/16

USPC .......................................................... 701/23
See application file for complete search history.

(56) References Cited

U.S. PATENT DOCUMENTS

| | | | |
|---|---|---|---|
| 9,902,317 B1 * | 2/2018 | Chuang | B60Q 1/52 |
| 2017/0315551 A1 * | 11/2017 | Mimura | B60W 50/08 |
| 2017/0327115 A1 * | 11/2017 | Tokimasa | G08G 1/16 |
| 2018/0357484 A1 * | 12/2018 | Omata | G08G 1/167 |
| 2019/0168751 A1 * | 6/2019 | Iyengar | G01C 21/34 |
| 2019/0324463 A1 * | 10/2019 | Zhu | B60W 10/04 |
| 2019/0359202 A1 * | 11/2019 | Zhu | G05D 1/0242 |
| 2019/0382016 A1 * | 12/2019 | Chow | B60W 30/18009 |

(Continued)

FOREIGN PATENT DOCUMENTS

| | | |
|---|---|---|
| CN | 207225208 | 4/2018 |
| EP | 3822731 | 5/2021 |
| TW | 201626347 | 7/2016 |

*Primary Examiner* — Yazan A Soofi
(74) *Attorney, Agent, or Firm* — ScienBiziP, P.C.

(57) ABSTRACT

A method for controlling the motion of a mobile warning triangle for placement behind a stationary vehicle on a roadway acquires color information of the lane markings detected by a first sensor, a second sensor, and a third sensor of the mobile warning triangle. When the mobile warning triangle is placed on the roadway, the first to third sensors are preset in position to detect the lane markings and their colors. The white or yellow color information of the lane markings or of the black-colored roadway are detected or not detected on an individual basis by the sensors and deviations from a required path are recognized when different colors are received in certain combinations by the sensors. If no deviation is recognized in the colors, the mobile warning triangle is controlled to continue moving forward.

17 Claims, 11 Drawing Sheets

(56) References Cited

U.S. PATENT DOCUMENTS

| | | | |
|---|---|---|---|
| 2020/0057487 A1* | 2/2020 | Sicconi | G06T 7/254 |
| 2021/0149410 A1* | 5/2021 | Chien | G06V 10/56 |
| 2022/0057801 A1* | 2/2022 | Chien | G05D 1/0234 |

* cited by examiner

METHOD OF CONTROLLING MOTION OF MOBILE WARNING TRIANGLE AND MOBILE WARNING TRIANGLE EMPLOYING METHOD

FIELD

The subject matter herein generally relates to road safety.

BACKGROUND

A warning triangle raised at a distance from a broken-down car warns other vehicles of an obstruction or other danger ahead. A mobile warning triangle in motion towards a point of placement may deviate from a correct path.

BRIEF DESCRIPTION OF THE DRAWINGS

Implementations of the present technology will now be described, by way of example only, with reference to the attached figures.

DETAILED DESCRIPTION

Figure 1:
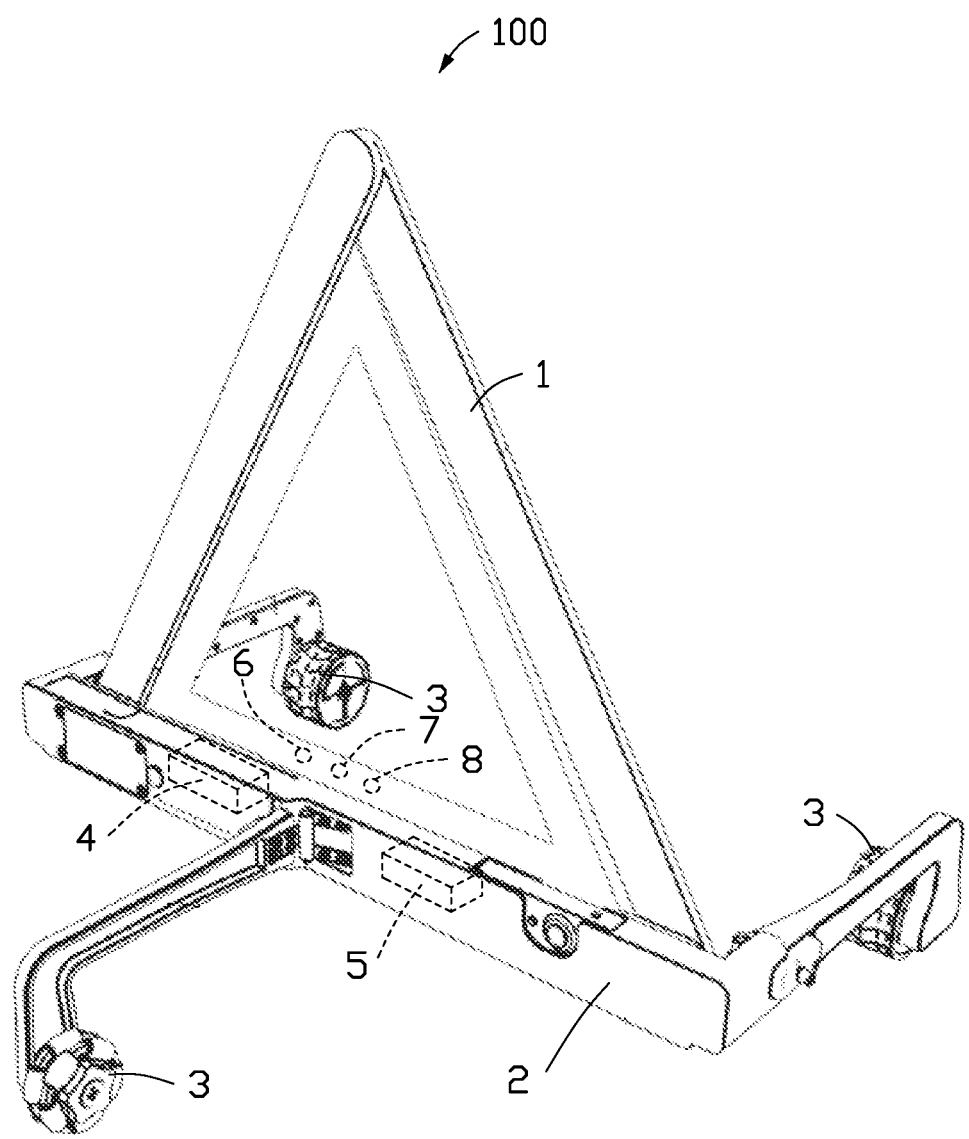
FIG. 1 is a diagram of an exemplary embodiment of a mobile warning triangle.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a mobile warning triangle 100 in accordance with an exemplary embodiment.

The mobile warning triangle 100 comprises a warning triangle 1, a base 2, three wheels 3, a control device 4, a motor 5, a first sensor 6, a second sensor 7, and a third sensor 8. The second sensor 7 is located between the first sensor 6 and the third sensor 8. The first sensor 6 and the third sensor 8 can be symmetrically arranged with respect to the second sensor 7. The control device 4 can guide the mobile warning triangle 100 to move forward along a lane marking. The control device 4 can further correct a moving direction of the mobile warning triangle 100.

In one embodiment, the first sensor 6 and the third sensor 8 may also be arranged asymmetrically with respect to the second sensor 7.

The mobile warning triangle 100 can be raised and placed at a first predetermined distance from a stationary car or another road impediment. The first predetermined distance can be 100 meters or 150 meters for example.

The first sensor 6, the second sensor 7, and the third sensor 8 can be color-sensitive sensors. For example, the first sensor 6, the second sensor 7, and the third sensor 8 are TCS3200 color sensors. In the TCS3200 color sensor, if a color filter is selected, only a primary color corresponding to the color filter is allowed to pass, and other primary colors are blocked. If a red filter is selected, the incident red light can be passed, but blue light and green light are blocked, and intensity of the red light can be obtained. Similarly, by selecting other filters, blue light can be passed, obtained, and measured for intensity, and similarly for green light. Then, the color and intensity of the light incident on the TCS3200 color sensor can be recognized.

In one embodiment, the first sensor 6, the second sensor 7, and the third sensor 8 can be installed at the bottom of the mobile warning triangle 100, such as the bottom of the warning triangle 1 or the bottom of the base 2, to better detect a lane marking. For example, when the mobile warning triangle 100 is moving, the first sensor 6, the second sensor 7, and the third sensor 8 can be directed downward to detect the lane marking.

In one embodiment, the first sensor 6, the second sensor 7, and the third sensor 8 can acquire color information of any scene or object or marking towards which the sensor may be directed.

In one embodiment, three or more sensors can be installed at the bottom of the mobile warning triangle 100, the number of sensors can be according to an actual application.

Figure 2:
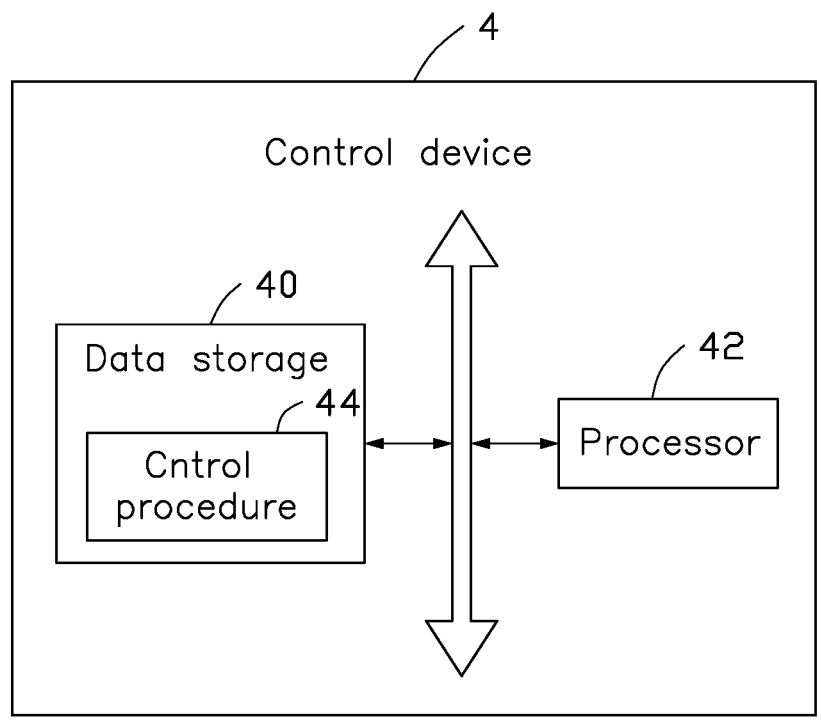
FIG. 2 is a block diagram of an exemplary embodiment of a control device of the mobile warning triangle of FIG. 1.

Referring to FIG. 2, the control device 4 can comprise at least one data storage 40, at least one processor 42, and a control procedure 44.

In one embodiment, the data storage 40 can be in the mobile warning triangle 100, or can be a separate external memory card, such as an SM card (Smart Media Card), an SD card (Secure Digital Card), or the like. The data storage 40 can include various types of non-transitory computer-readable storage mediums. For example, the data storage 40 can be an internal storage system, such as a flash memory, a random access memory (RAM) for the temporary storage of information, and/or a read-only memory (ROM) for permanent storage of information. The data storage 40 can also be an external storage system, such as a hard disk, a storage card, or a data storage medium. The processor 42 can be a central processing unit (CPU), a microprocessor, or other data processor chip that performs functions of the mobile warning triangle 100.

Figure 3:
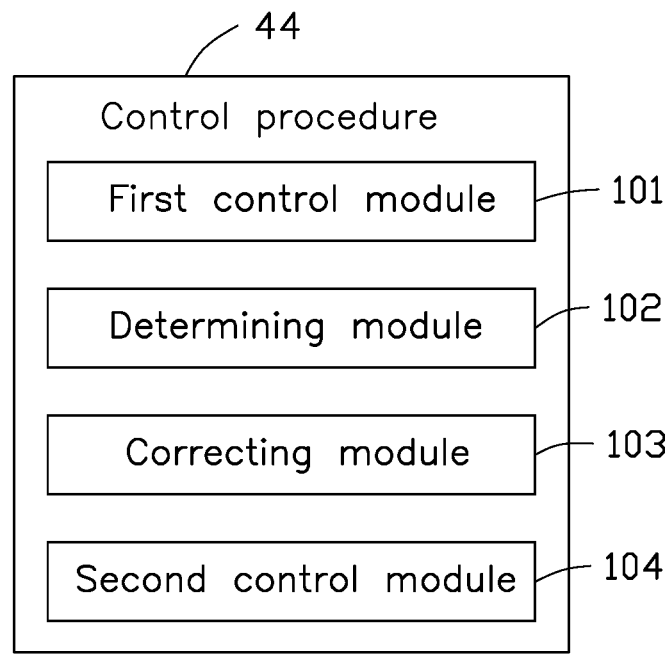
FIG. 3 is a block diagram of an exemplary embodiment of a control procedure of the control device of FIG. 2.

FIG. 3 illustrates the control procedure 44 as comprising a plurality of modules, such as a first control module 101, a determining module 102, a correcting module 103, and a second control module 104. The modules 101-104 can comprise one or more software programs in the form of computerized codes stored in the data storage 40. The computerized codes can include instructions that can be executed by the processor 42 to provide functions for the modules 101-104.

The mobile warning triangle 100 is placed on a lane, and the first sensor 6, the second sensor 7, and the third sensor 8 can all detect a lane marking of the lane as an example.

Figure 4A:
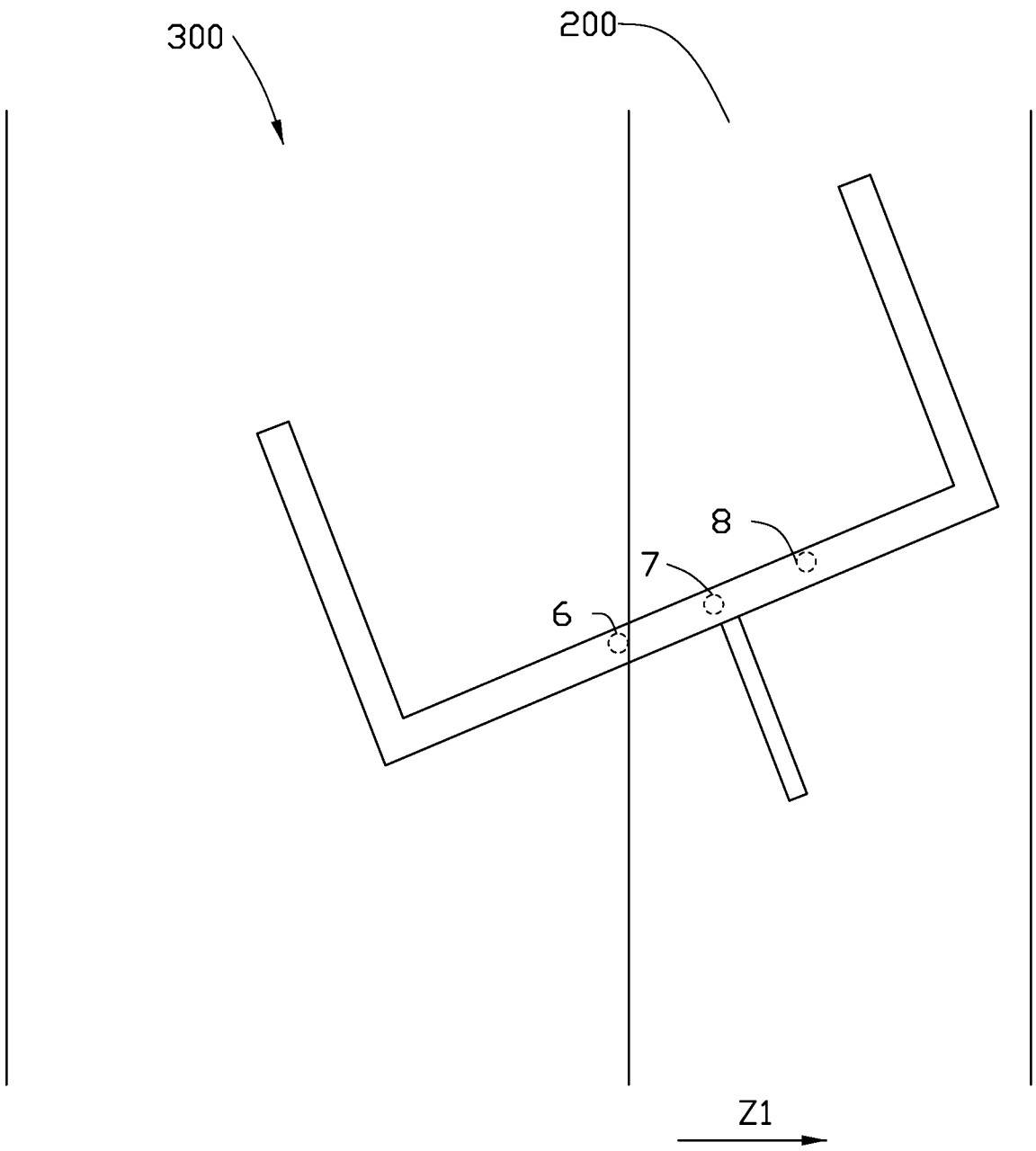
FIGS. 4A-4D show the mobile warning triangle in motion along a lane marking with three sensors working.

The first control module 101 can control the mobile warning triangle 100 to move forward or backward when the mobile warning triangle 100 is placed on a lane 300 (as shown in FIG. 4A) of a road or other traversable surface. The first sensor 6, the second sensor 7, and the third sensor 8 can all detect the lane marking 200 (as shown in FIG. 4A). The first sensor 6 can acquire color information (first color information), the second sensor 7 can acquire color information (second color information), and the third sensor 8 can acquire color information (third color information) when the mobile warning triangle 100 is moving forward or backward.

In one embodiment, the lane markings 200 of the road are white and yellow. Along an expressway or a provincial highway, the lane markings 200 are white markings and yellow markings, the road itself is black. There is a significant difference in color between the road and the lane markings 200. The first sensor 6, the second sensor 7, and the third sensor 8 can easily detect and identify the lane markings 200. When a vehicle is considered to be an obstacle on the road, the mobile warning triangle 100 is raised at the first predetermined distance from the stationary vehicle to warn other vehicles. A user can place the mobile warning triangle 100 on the lane 300 in which the vehicle is stationary, and aim the second sensor 7 at the lane marking 200 of the lane 300 (for example a white marking), both of the first sensor 6 and the third sensor 8 can detect such lane marking 200 at the same time. The three sensors 6, 7, and 8 can detect the lane marking 200 to control the mobile warning triangle 100 to move forward along the lane marking 200. When the mobile warning triangle 100 is placed on the lane 300 and the first sensor 6, the second sensor 7, and the third sensor 8 can all detect the lane marking 200 of the lane 300, the first control module 101 controls the mobile warning triangle 100 to move forward. When the mobile warning triangle 100 is moving, the first control module 101 can obtain the first color information, the second color information, the third color information detected by the first to third sensors 6, 7, and 8 respectively in real time to determine a lane departure by the mobile warning triangle 100.

In one embodiment, a first installation distance between the first sensor 6 and the second sensor 7 and a second installation distance between the second sensor 7 and the third sensor 8 are preset, and detection angles of the three sensors 6, 7 and 8 are limited according to an actual requirement. Then, the first sensor 6, the second sensor 7, and the third sensor 8 can simultaneously detect the same lane marking 200.

The determining module 102 determines whether the first color information detected by the first sensor 6, the second color information detected by the second sensor 7, and the third color information detected by the third sensor 8 are all the one color of the particular lane marking 200.

In one embodiment, when the first control module 101 obtains the first color information detected by the first sensor 6, the second color information detected by the second sensor 7, and third color information detected by the third sensor 8, the determining module 102 can determine whether the first color information detected by the first sensor 6, the second color information detected by the second sensor 7, and the third color information detected by the third sensor 8 are all the one color of the lane marking 200.

In one embodiment, when the determining module 102 determines that the first color information detected by the first sensor 6, the second color information detected by the second sensor 7, and the third color information detected by the third sensor 8 are all the color of the lane marking 200, the mobile warning triangle 100 is deemed to be still moving forward along the lane marking 200. There is no deviation of the mobile warning triangle 100 noted, and the first control module 101 controls the mobile warning triangle 100 to continue moving forward.

The correcting module 103 corrects a moving direction of the mobile warning triangle 100 to a first direction by a first predetermined angle when the first color information detected by the first sensor 6 is different but the second color information detected by the second sensor 7 and the third color information detected by the third sensor 8 remain the color of the lane marking 200.

In one embodiment, as shown in FIG. 4A, the first direction Z1 can be a right side of the mobile warning triangle 100. When the determining module 102 determines that the first color information detected by the first sensor 6 is different, a deviation may be assumed. As shown in FIG. 4a, when the mobile warning triangle 100 is not moving forward along the lane marking 200, the control device 4 may determine that a deviation has occurred in a moving direction of the mobile warning triangle 100. For example, when the first color information detected by the first sensor 6 is not the color of the lane marking 200, but the second color information detected by the second sensor 7 and the third color information detected by the third sensor 8 are both the color of the lane marking 200, the mobile warning triangle 100 is deemed to be deviated towards a left side of the lane marking 200. The correcting module 103 can correct the moving direction of the mobile warning triangle 100 towards a right side of the lane marking 200 by the first predetermined angle.

In one embodiment, the first predetermined angle can be defined according to the actual requirement, for example, the first predetermined angle is 10 degrees.

When the mobile warning triangle 100 is deviating towards the left side of the lane marking 200 and the correcting module 103 corrects the moving direction of the mobile warning triangle 100 to the first direction Z1 by the first predetermined angle, then the first color information detected by the first sensor 6, the second color information detected by the second sensor 7, and the third color information detected by the third sensor 8 should all be the one color of the lane marking 200. This would indicate that this direction correction is correct, and the first control module 101 can control the mobile warning triangle 100 to continue moving forward.

In one embodiment, the correction by the correcting module 103 of the moving direction of the mobile warning triangle 100 to the first direction Z1 by the first predetermined angle may comprise: performing a direction correction on the mobile warning triangle 100 to the first direction Z1 by the first predetermined angle; determining whether the first color information detected by the first sensor 6, the second color information detected by the second sensor 7, and the third color information detected by the third sensor 8 are all the color of the lane marking 200 during the direction correction of the mobile warning triangle 100; and stopping the direction correction on the mobile warning triangle 100 when the first color information detected by the first sensor 6, the second color information detected by the second sensor 7, and the third color information detected by the third sensor 8 are all the color of the lane marking. That is, when the first color information detected by the first sensor 6, the second color information detected by the second sensor 7, and the third color information detected by the third sensor 8 are all the color of the lane marking during the direction correction on the mobile warning triangle 100, the direction correction on the mobile warning triangle 100 can be stopped, even though the actual and resulting correction angle of the mobile warning triangle 100 is less than the first predetermined angle.

In one embodiment, the correcting module 103 can correct the moving direction of the mobile warning triangle 100 to the first direction by the first predetermined angle at a first angle-correction speed. The first angle-correction speed can be defined according to the actual requirement, for example, the first angle-correction speed is 5 degrees/second.

Figure 4B:
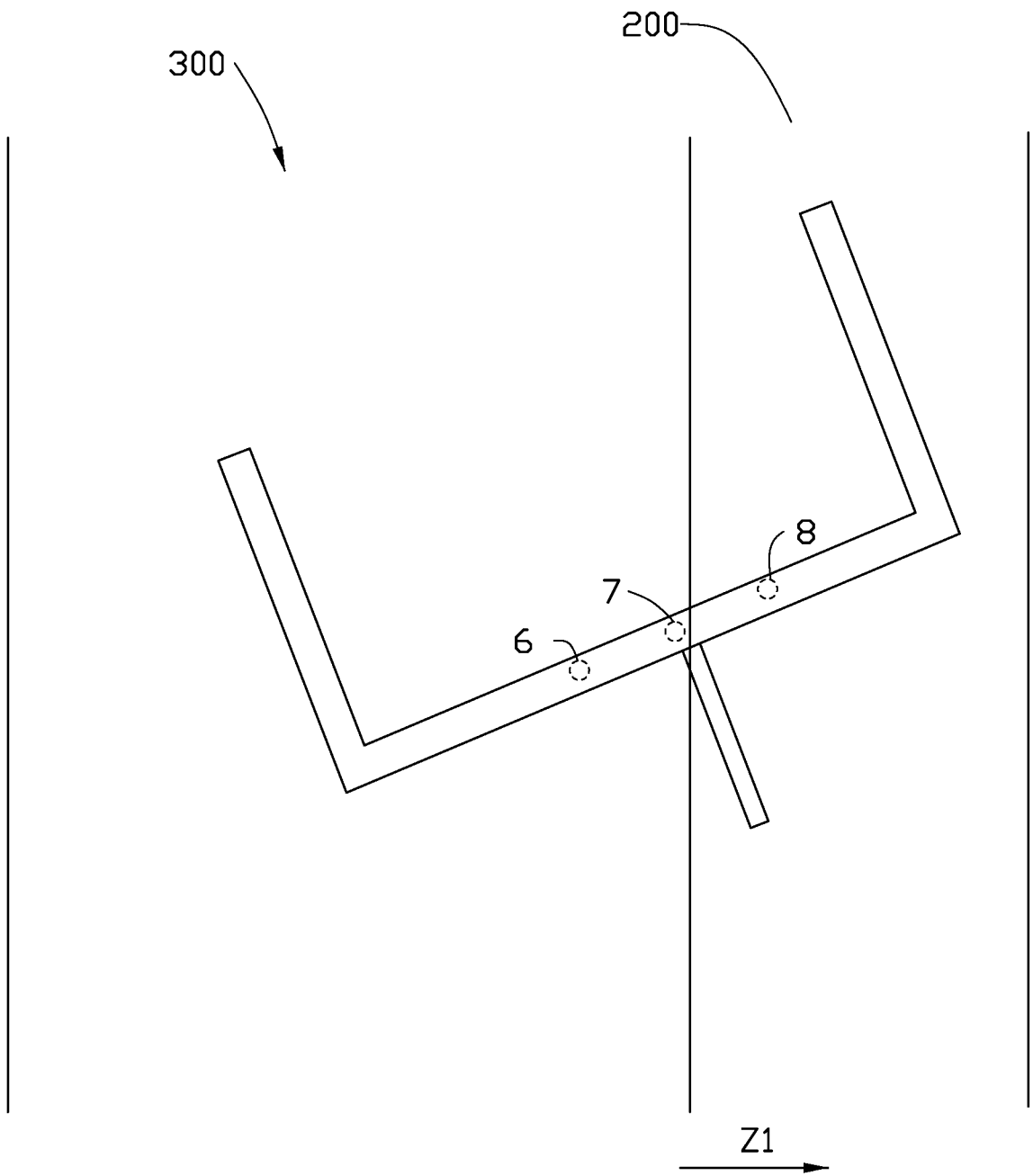

In one embodiment, when the first color information detected by the first sensor 6 and the second color information detected by the second sensor 7 are both not the color of the lane marking, and the third color information detected by the third sensor 8 is the color of the lane marking 200, this is taken as an indication that the mobile warning triangle 100 has deviated greatly to the left side of the lane marking 200 (as shown in FIG. 4B), and the correcting module 103 can correct the moving direction of the mobile warning triangle 100 to a third predetermined angle toward the first direction Z1, to continue moving forward. The third predetermined angle may be greater than the first predetermined angle. A value of the third predetermined angle can be defined based on the actual application. For example, the third predetermined angle is 15 degrees.

In one embodiment, the correcting module 103 can correct the moving direction of the mobile warning triangle 100 to the first direction Z1 by the third predetermined angle at a second angle-correction speed. The second angle-correction speed may be less than the first angle-correction speed. Then, when there is a large deviation, the mobile warning triangle 100 is corrected with a slow angle-correction speed, and the direction correction can be performed more accurately. The second angle-correction speed can be defined according to the actual requirement. For example, the second angle-correction speed is 3 degrees/second.

When the first color information detected by the first sensor 6 and the second color information detected by the second sensor 7 are both the color of the lane marking, and the third color information detected by the third sensor 8 is not the color of the lane marking 200, the correcting module 103 can correct the moving direction of the mobile warning triangle 100 to a second predetermined angle toward a second direction.

Figure 4C:
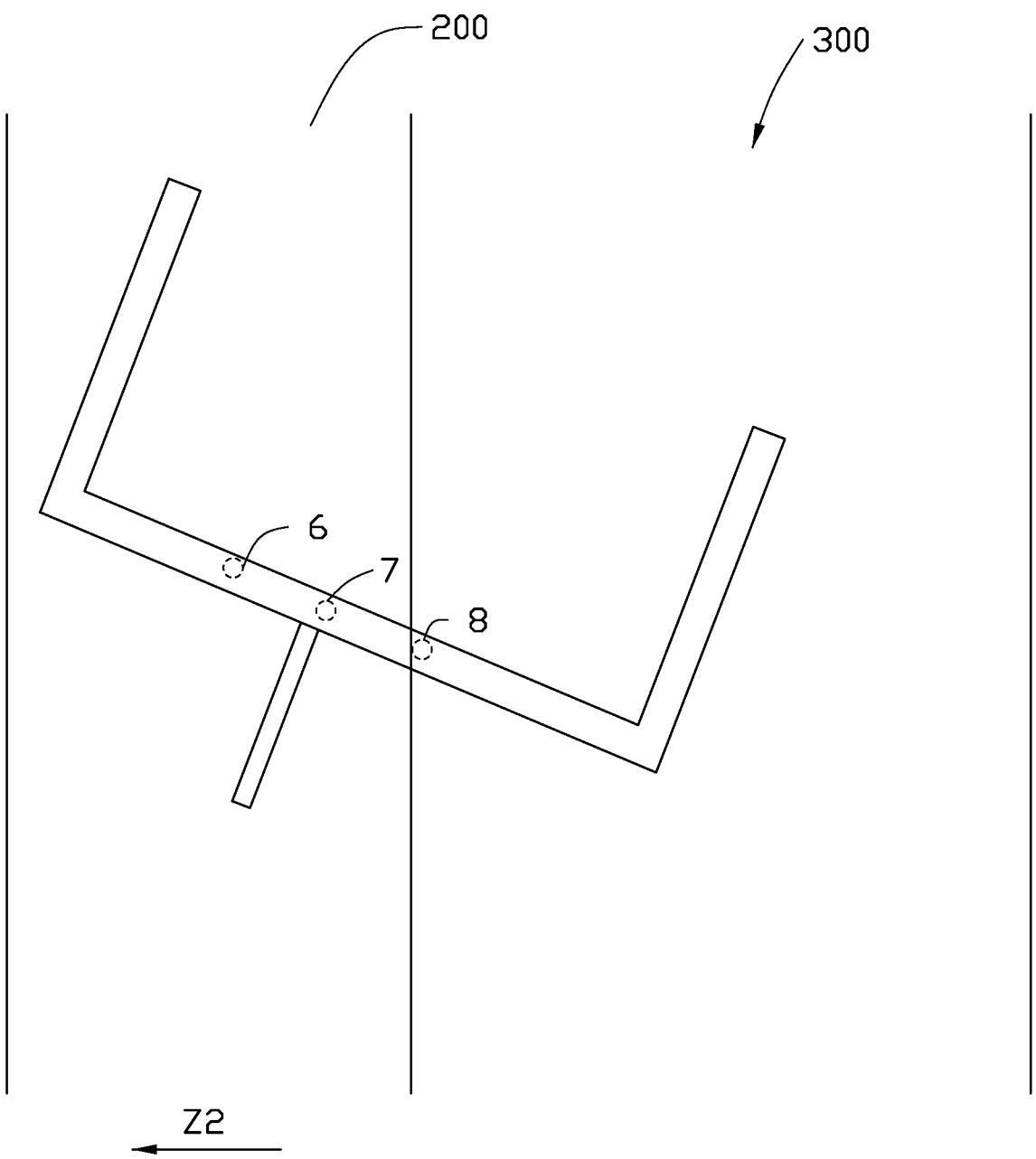

In one embodiment, when the first color information detected by the first sensor 6 and the second color information detected by the second sensor 7 are both the color of the lane marking, and the third color information detected by the third sensor 8 is not the color of the lane marking 200, this is taken as a deviation event, that the mobile warning triangle 100 has deviated to a right side of the lane marking 200 (as shown in FIG. 4C). The correcting module 103 can correct the moving direction of the mobile warning triangle 100 to the second predetermined angle toward the second direction Z2 to continue moving forward. The second predetermined angle can be defined based on the actual application. For example, the second predetermined angle is 10 degrees.

When the mobile warning triangle 100 has deviated to the right side of the lane marking 200 and the correcting module 103 corrects the moving direction of the mobile warning triangle 100 to the second direction Z2 by the second predetermined angle, and the first color information detected by the first sensor 6, the second color information detected by the second sensor 7, and the third color information detected by the third sensor 8 are all the color of the lane marking 200, this is taken as a correction of direction, and the first control module 101 can control the mobile warning triangle 100 to continue moving forward.

In one embodiment, the correcting by the correcting module 103 of the moving direction of the mobile warning triangle 100 to the second predetermined angle toward the second direction Z2 may comprise: performing a direction correction on the mobile warning triangle 100 to the second direction Z2 by the second predetermined angle and determining whether the first color information detected by the first sensor 6, the second color information detected by the second sensor 7, and the third color information detected by the third sensor 8 are all the color of the lane marking 200 during the direction correction of the mobile warning triangle 100. The correction of direction is stopped when the first color information detected by the first sensor 6, the second color information detected by the second sensor 7, and the third color information detected by the third sensor 8 are all the color of the lane marking. That is, when the first color information detected by the first sensor 6, the second color information detected by the second sensor 7, and the third color information detected by the third sensor 8 are all the color of the lane marking during the direction correction on the mobile warning triangle 100, the direction correction on the mobile warning triangle 100 can be stopped, even though the resulting and actual angular correction of the mobile warning triangle 100 is less than the second predetermined angle.

In one embodiment, the correcting module 103 can correct the moving direction of the mobile warning triangle 100 to the second direction Z2 by the second predetermined angle at a third angle-correction speed. The third angle-correction speed can be defined according to the actual requirement, for example, the third angle-correction speed is 4 degrees/second.

Figure 4D:
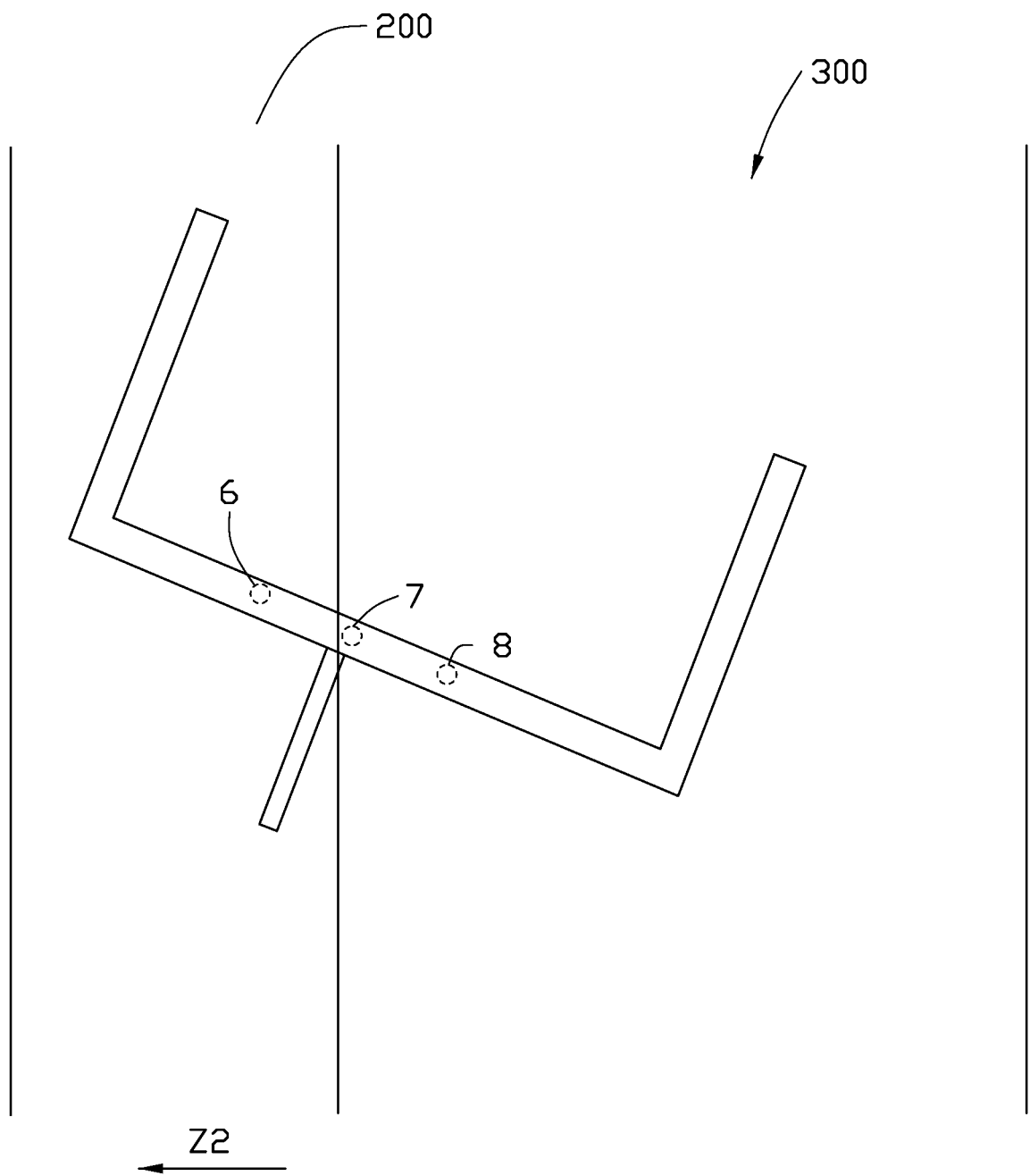

In one embodiment, when the first color information detected by the first sensor 6 is the color of the lane marking 200, and the second color information detected by the second sensor 7 and the third color information detected by the third sensor 8 are both not the color of the lane marking 200, this is taken as a deviation event where the mobile warning triangle 100 has deviated greatly to the right side of the lane marking 200 (as shown in FIG. 4D). The correcting module 103 can correct the moving direction of the mobile warning triangle 100 to a fourth predetermined angle toward the second direction Z2 to continue moving forward. The fourth predetermined angle may be greater than the second predetermined angle. A value of the fourth predetermined angle can be defined based on the actual application. For example, the fourth predetermined angle is 15 degrees.

In one embodiment, the correcting module 103 can correct the moving direction of the mobile warning triangle 100 to the second direction Z2 by the fourth predetermined angle at a fourth angle-correction speed. The fourth angle-correction speed may be less than the third angle-correction speed. Then, when a large deviation is occurring, the mobile warning triangle 100 is corrected with a slow angle-correction speed, the direction correction can be performed more accurately. The fourth angle-correction speed can be defined according to the actual requirement. For example, the fourth angle-correction speed is 2.5 degrees/second.

The second control module 104 controls the mobile warning triangle 100 to stop moving when the first color information detected by the first sensor 6, the second color information detected by the second sensor 7, and the third color information detected by the third sensor 8 are all not the color of the lane marking.

In one embodiment, when the first color information detected by the first sensor 6, the second color information detected by the second sensor 7, and the third color information detected by the third sensor 8 are all not the color of the lane marking, this is taken as deviation event, and manual intervention is required at this time. The second control module 104 can control the mobile warning triangle 100 to stop moving and output a prompt to inform a user to perform manual intervention. For example, the user can manually correct the position of the mobile warning triangle 100, so that the first sensor 6, the second sensor 7, and the third sensor 8 can all once again detect the lane marking 200 and its color. The prompt can be outputted audibly or visually by the mobile warning triangle 100, or can be output by an application program of the mobile warning triangle 100.

In one embodiment, when a moving distance of the mobile warning triangle 100 is equal to the predetermined moving distance, this may be taken as an in-place or placement event, that the mobile warning triangle 100 has moved to a suitable distance behind the vehicle, and the second control module 104 can control the mobile warning triangle 100 to stop moving. The predetermined moving distance can be set according to the actual application, for example, the predetermined moving distance is defined as 150 meters. The mobile warning triangle 100 can also support a manual mode or an APP mode to define the predetermined moving distance.

In one embodiment, when the moving distance of the mobile warning triangle 100 is equal to the predetermined moving distance, the mobile warning triangle 100 can be taken as suitably placed, and the second control module 104 can control the mobile warning triangle 100 to move a second distance. Such second distance is a lateral movement to one side or another, specifically toward a side where the first sensor 6 or the third sensor 8 is located, and once again stop moving. Thereby, the mobile warning triangle 100 can be actually placed or parked in a middle area of the lane 300 to render a warning effect more effective. For example, the mobile warning triangle 100 can move a second distance toward a left side or a right side by receiving a control instruction outputted by the APP, and then stop moving. The second distance can be defined according to the actual requirement, for example, the second distance is 1.5 meters.

The mobile warning triangle 100 is thus placed on a lane, the second sensor 7 can detect the lane marking 200, and the first sensor 6 and the third sensor 8 cease detecting the lane marking 200 as an example.

Figure 5A:
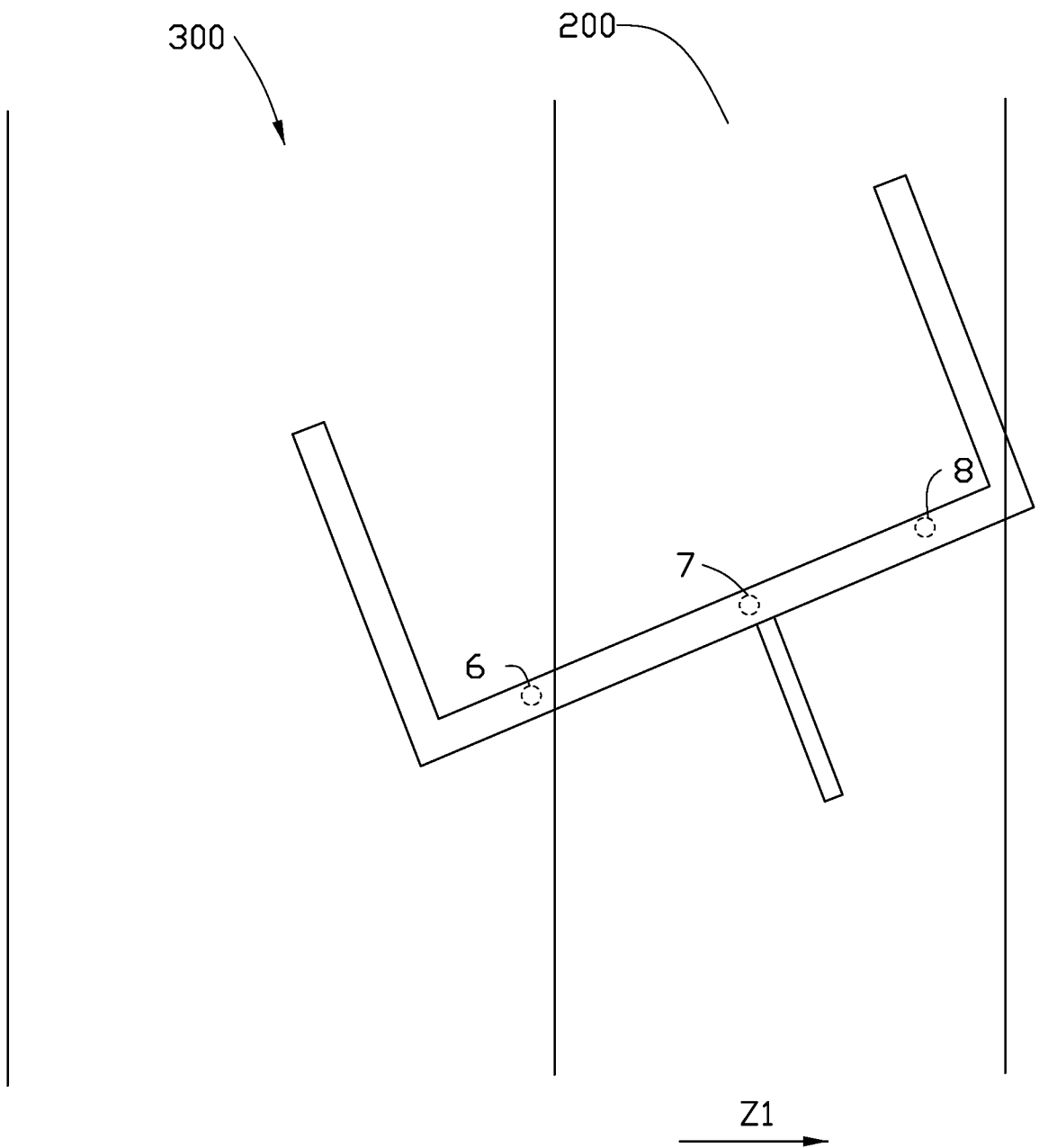
FIGS. 5A-5B also show the mobile warning triangle in motion along a lane marking with three sensors working.

The first control module 101 can control the mobile warning triangle 100 to move forward or backward and when the mobile warning triangle 100 is placed on the lane 300 of a road or other traversable surface. Herein, the second sensor 7 can detect the lane marking 200, but the first sensor 6 and the third sensor 8 do not detect the lane marking 200 (as shown in FIG. 5A). The first sensor 6 can acquire the first color information, the second sensor 7 can acquire the second color information, and the third sensor 8 can acquire the third color information during the mobile warning triangle 100 moving forward or backward.

In one embodiment, the lane markings 200 of the load are white markings or are yellow markings. The user can place the mobile warning triangle 100 on the lane 300 in which the vehicle is stationary, and aim the second sensor 7 at the lane marking 200 of the lane 300 (for example a white marking), but neither of the first sensor 6 and the third sensor 8 can detect the lane marking 200. The second sensor 7 can detect the lane marking 200 to control the mobile warning triangle 100 to move forward along the lane marking 200. When the mobile warning triangle 100 is placed on the lane 300 and only the second sensor 7 can detect the lane marking 200 of the lane 300, the first control module 101 can control the mobile warning triangle 100 to move forward. When the mobile warning triangle 100 is moving, the first control module 101 can obtain the first color information, the second color information, the third color information detected by the first sensor 6, the second sensor 7, and the third sensor 8 respectively in real time to determine a direction departure by the mobile warning triangle 100.

In one embodiment, a first installation distance between the first sensor 6 and the second sensor 7 and a second installation distance between the second sensor 7 and the third sensor 8 are preset and detection angles of the three sensors 6, 7 and 8 are limited according to an actual requirement. Thus, a single lane marking 200 and its color cannot be simultaneously detected by the first sensor 6, the second sensor 7, and the third sensor 8.

The determining module 102 determines whether the first color information detected by the first sensor 6, the second color information detected by the second sensor 7, and the third color information detected by the third sensor 8 are all the one color of the lane marking 200.

In one embodiment, when the first control module 101 obtains the first color information detected by the first sensor 6, the second color information detected by the second sensor 7, and third color information detected by the third sensor 8, the determining module 102 can determine whether the first color information detected by the first sensor 6, the second color information detected by the second sensor 7, and the third color information detected by the third sensor 8 are the one color of the lane marking 200.

In one embodiment, when the determining module 102 determines that the first color information detected by the first sensor 6 is the color of the lane marking 200, and the second color information detected by the second sensor 7 and the third color information detected by the third sensor 8 are not all the one color of the lane marking 200, the mobile warning triangle 100 is taken to be still moving forward along the lane marking 200. There is no deviation of the mobile warning triangle 100 to be noticed, and the first control module 101 controls the mobile warning triangle 100 to continue moving forward.

The correcting module 103 corrects a moving direction of the mobile warning triangle 100 to a first direction by a first predetermined angle when the first color information detected by the first sensor 6 is not the color of the lane marking 200, but the second color information detected by the second sensor 7 and the third color information detected by the third sensor 8 are both the color of the lane marking 200.

In one embodiment, as shown in FIG. 5A, the first direction Z1 can be a right side of the mobile warning triangle 100. When the determining module 102 determines that the first color information detected by the first sensor 6 is not the color of the lane marking 200, but the second color information detected by the second sensor 7 and the third color information detected by the third sensor 8 are both the one color of the lane marking 200, a deviation event can be determined. When the mobile warning triangle 100 is not moving forward along the lane marking 200, a determination that a deviation event has occurred is made. For example, the first color information detected by the first sensor 6 is not the color of the lane marking 200, but the second color information detected by the second sensor 7 and the third color information detected by the third sensor 8 are both the color of the lane marking 200. Such a deviation event is taken as a deviation to a left side of the lane marking 200 by the mobile warning triangle 100. The correcting module 103 can correct the moving direction of the mobile warning triangle 100 to a right side of the lane marking 200 by the first predetermined angle.

In one embodiment, the first predetermined angle can be defined according to the actual requirement, for example, the first predetermined angle is 10 degrees.

When the mobile warning triangle 100 is deviating towards the left side of the lane marking 200 and the correcting module 103 corrects the moving direction of the mobile warning triangle 100 to the first direction Z1 by the first predetermined angle, the first color information detected by the first sensor 6 and the third color information detected by the third sensor 8 are not the color of the lane marking 200, and the second color information detected by the second sensor 7 is the color of the lane marking 200, it indicates that this direction correction is correct, and the first control module 101 can control the mobile warning triangle 100 to continue moving forward.

In one embodiment, the correction by the correcting module 103 of the moving direction of the mobile warning triangle 100 to the first direction Z1 by the first predetermined angle may comprise: performing a direction correction on the mobile warning triangle 100 to the first direction Z1 by the first predetermined angle; determining whether the first color information detected by the first sensor 6 and the third color information detected by the third sensor 8 are not the color of the lane marking 200, and the second color information detected by the second sensor 7 is the color of the lane marking 200 during the direction correction of the mobile warning triangle 100; and stopping the direction correction on the mobile warning triangle 100 when only the second color information detected by the second sensor 7 is the color of the lane marking. That is, when the first color information detected by the first sensor 6 and the third color information detected by the third sensor 8 are not the color of the lane marking, and the second color information detected by the second sensor 7 is the color of the lane marking 200 during the direction correction on the mobile warning triangle 100, the direction correction on the mobile warning triangle 100 can be stopped, even though the actual and resulting correction angle of the mobile warning triangle 100 is less than the first predetermined angle.

Figure 5B:
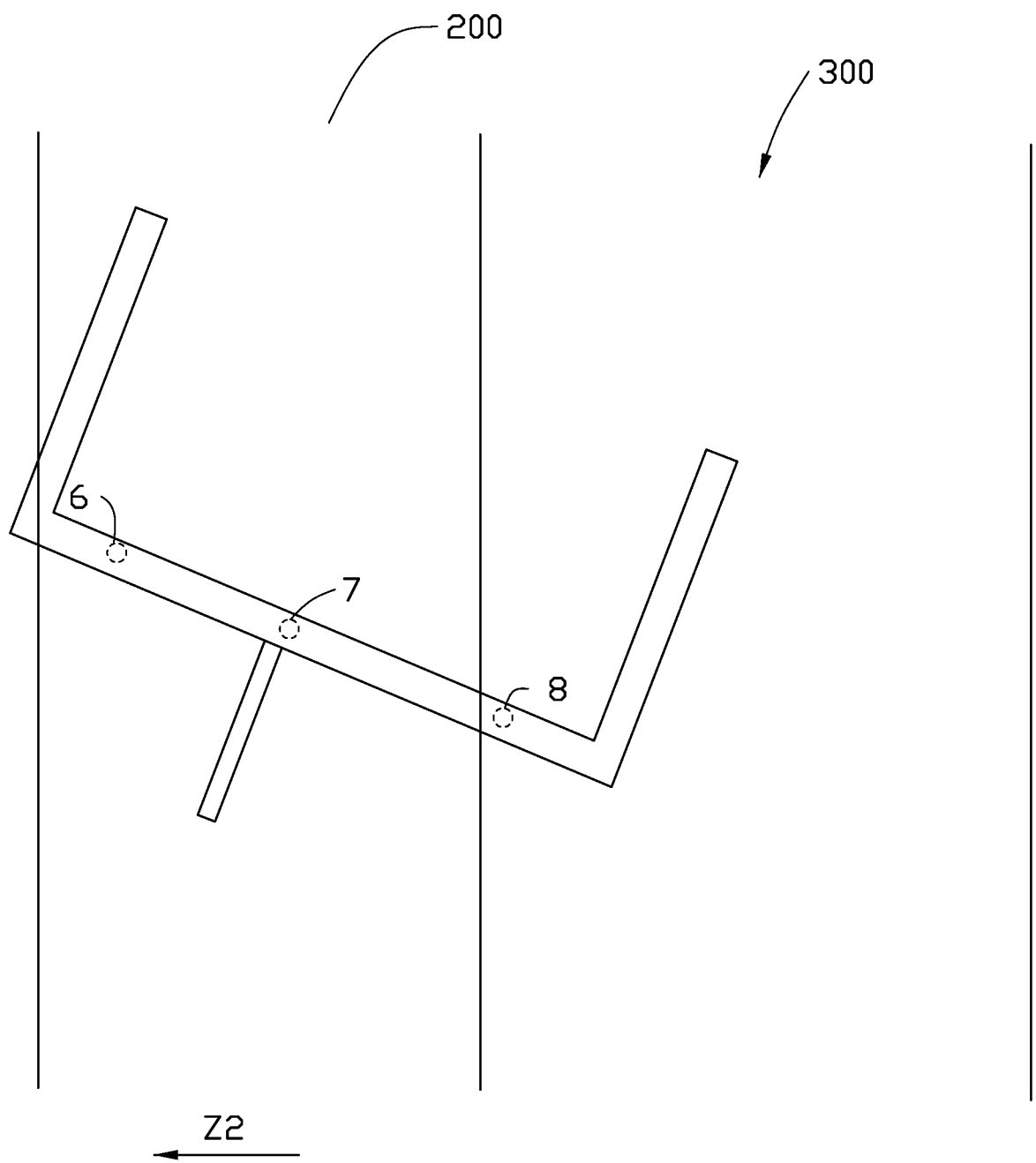

When the first color information detected by the first sensor 6 and the second color information detected by the second sensor 7 are both the color of the lane marking, and the third color information detected by the third sensor 8 is not the color of the lane marking 200, this is taken as an indication that the mobile warning triangle 100 is deviating towards a right side of the lane marking 200 (as shown in FIG. 5B), and the correcting module 103 can correct the moving direction of the mobile warning triangle 100 to a second predetermined angle toward a second direction Z2 to continue moving forward. The second predetermined angle can be defined based on the actual application. For example, the second predetermined angle is 10 degrees.

When the mobile warning triangle 100 is deviating towards the right side of the lane marking 200 and the correcting module 103 corrects the moving direction of the mobile warning triangle 100 to the second direction Z2 by the second predetermined angle, the first color information detected by the first sensor 6 and the third color information detected by the third sensor 8 are not the color of the lane marking 200, and the second color information detected by the second sensor 7 is the color of the lane marking 200, it indicates that this direction correction is correct, and the first control module 101 can control the mobile warning triangle 100 to continue moving forward.

In one embodiment, the correction by the correcting module 103 of the moving direction of the mobile warning triangle 100 to the second predetermined angle toward the second direction Z2 may comprise: performing a direction correction on the mobile warning triangle 100 to the second direction Z2 by the second predetermined angle; determining whether the first color information detected by the first sensor 6, the second color information detected by the second sensor 7, and the third color information detected by the third sensor 8 are the color of the lane marking 200 during the direction correction of the mobile warning triangle 100; and stopping to perform the direction correction on the mobile warning triangle 100 when the first color information detected by the first sensor 6 and the third color information detected by the third sensor 8 are not the color of the lane marking, and the second color information detected by the second sensor 7 is the color of the lane marking. That is, when the first color information detected by the first sensor 6 and the third color information detected by the third sensor 8 are not the color of the lane marking, and the second color information detected by the second sensor 7 is the color of the lane marking 200 during the direction correction on the mobile warning triangle 100, the direction correction on the mobile warning triangle 100 can be stopped in advance, and an actual correction angle of the mobile warning triangle 100 is less than the second predetermined angle.

Figure 6:
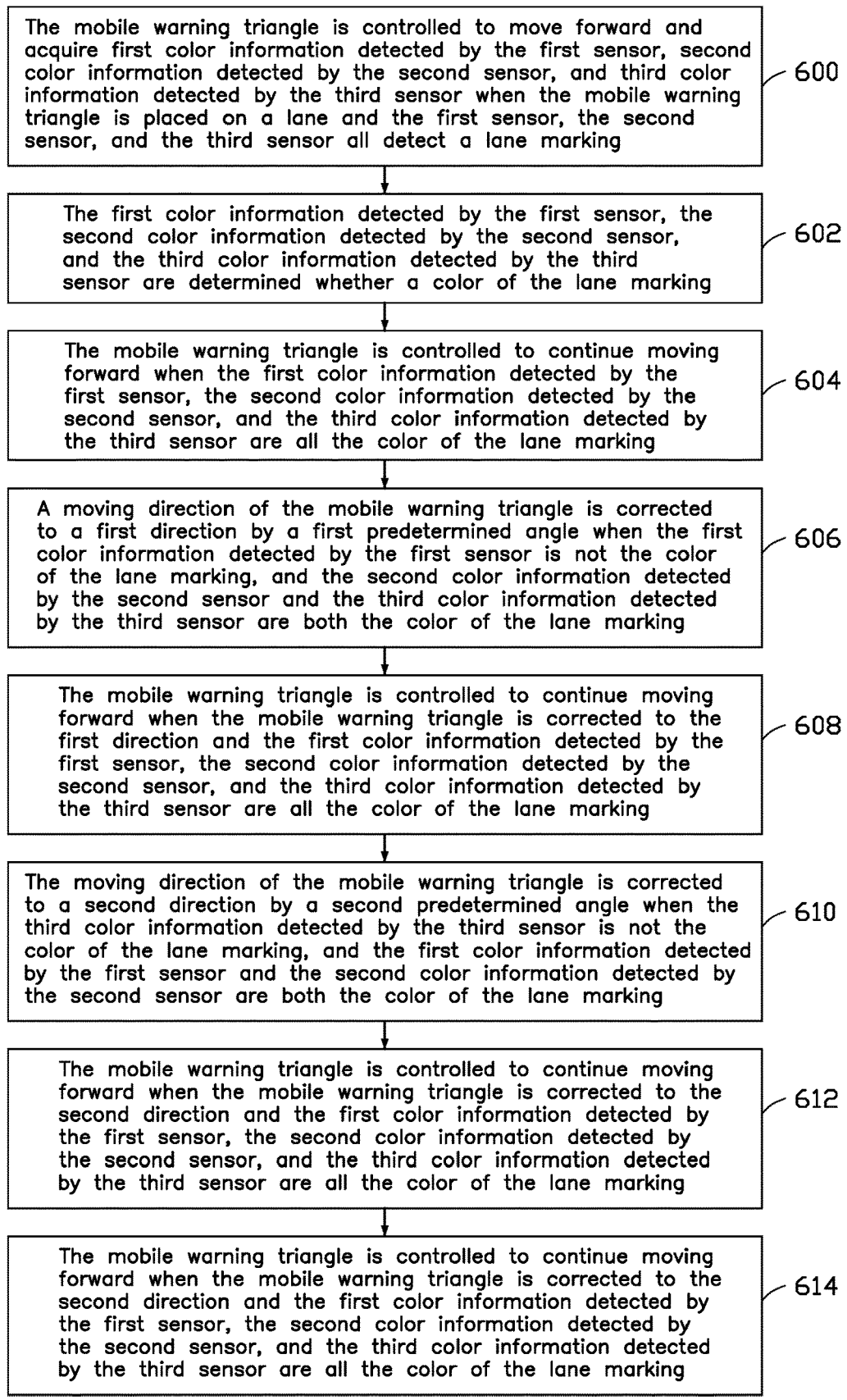
FIG. 6 is a flow diagram of a method in one embodiment for controlling the motion of the mobile warning triangle of FIG. 1.

FIG. 6 illustrates one exemplary embodiment of a method for controlling the motion of the mobile warning triangle 100. The flowchart presents an exemplary embodiment of the method. The exemplary method is provided by way of example, as there are a variety of ways to carry out the method. The method described below can be carried out using the configurations illustrated in FIG. 3, for example, and various elements of these figures are referenced in explaining the example method. Each step shown in FIG. 6 may represent one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at step 600.

In block 600, the mobile warning triangle 100 is controlled to move forward and acquire first color information detected by the first sensor 6, second color information detected by the second sensor 7, and third color information detected by the third sensor 8 when the mobile warning triangle 100 is placed on a lane 300 and the first sensor 6, the second sensor 7, and the third sensor 8 all detect a lane marking 200.

In block 602, the first color information detected by the first sensor 6, the second color information detected by the second sensor 7, and the third color information detected by the third sensor 8 are determined whether a color of the lane marking 200.

In block 604, the mobile warning triangle 100 is controlled to continue moving forward when the first color information detected by the first sensor 6, the second color information detected by the second sensor 7, and the third color information detected by the third sensor 8 are all the color of the lane marking 200.

In block 606, a moving direction of the mobile warning triangle 100 is corrected to a first direction by a first predetermined angle when the first color information detected by the first sensor 6 is not the color of the lane marking 200, and the second color information detected by the second sensor 7 and the third color information detected by the third sensor 8 are both the color of the lane marking 200.

In block 608, the mobile warning triangle 100 is controlled to continue moving forward when the mobile warning triangle 100 is corrected to the first direction and the first color information detected by the first sensor 6, the second color information detected by the second sensor 7, and the third color information detected by the third sensor 8 are all the color of the lane marking 200.

In block 610, the moving direction of the mobile warning triangle 100 is corrected to a second direction by a second predetermined angle when the third color information detected by the third sensor 8 is not the color of the lane marking 200, and the first color information detected by the first sensor 6 and the second color information detected by the second sensor 7 are both the color of the lane marking 200.

In block 612, the mobile warning triangle 100 is controlled to continue moving forward when the mobile warning triangle 100 is corrected to the second direction and the first color information detected by the first sensor 6, the second color information detected by the second sensor 7, and the third color information detected by the third sensor 8 are all the color of the lane marking 200.

In block 614, the mobile warning triangle 100 is controlled to stop moving when the first color information detected by the first sensor 6, the second color information detected by the second sensor 7, and the third color information detected by the third sensor 8 are all not the color of the lane marking 200.

Figure 7:
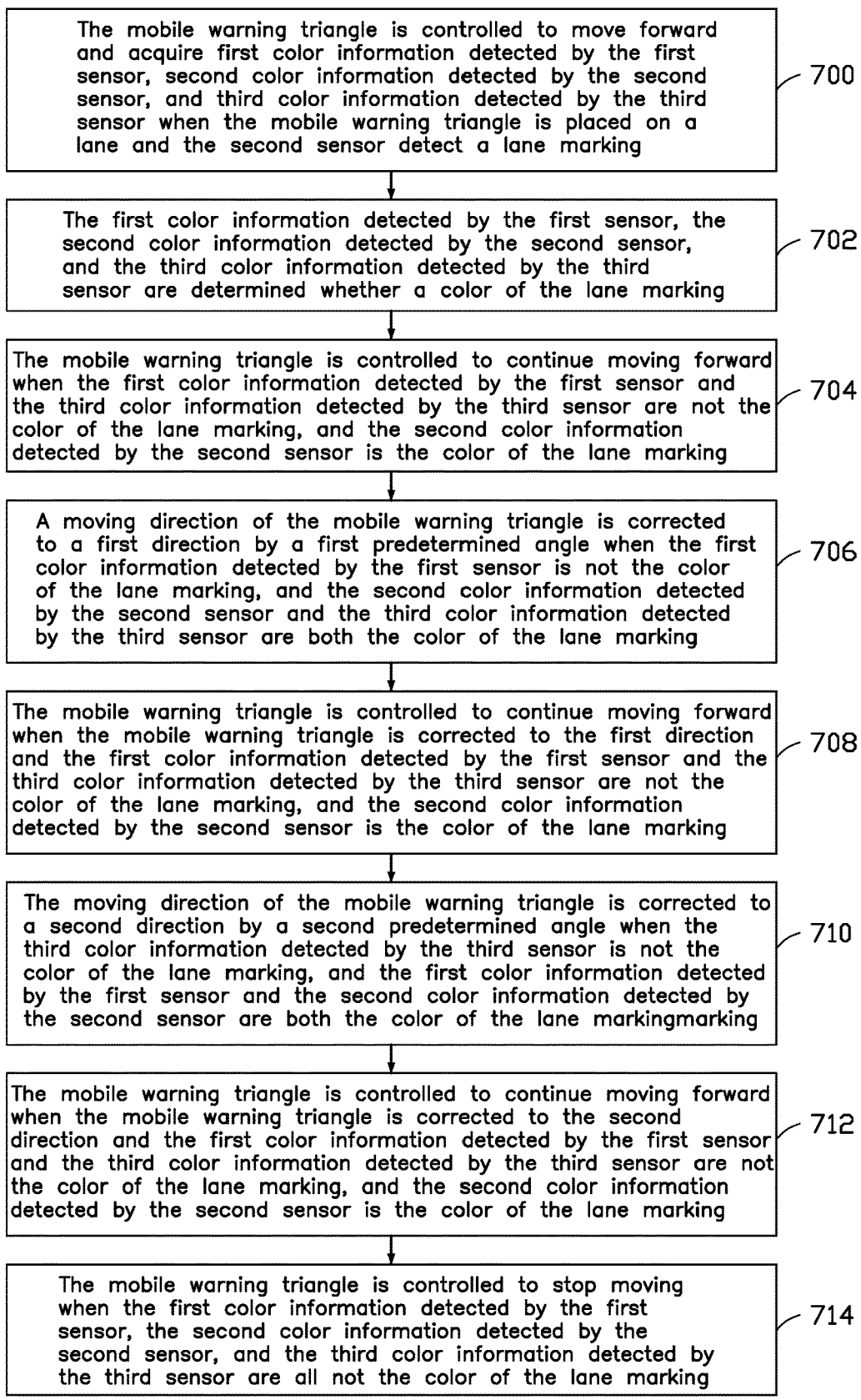
FIG. 7 is a flow diagram of a method in another embodiment for controlling the motion of the mobile warning triangle of FIG. 1.

FIG. 7 illustrates one exemplary embodiment of a driving control method of the mobile warning triangle 100. The flowchart presents an exemplary embodiment of the method. The exemplary method is provided by way of example, as there are a variety of ways to carry out the method. The method described below can be carried out using the configurations illustrated in FIG. 3, for example, and various elements of these figures are referenced in explaining the example method. Each step shown in FIG. 7 may represent one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at step 700.

In block 700, the mobile warning triangle 100 is controlled to move forward and acquire first color information detected by the first sensor 6, second color information detected by the second sensor 7, and third color information detected by the third sensor 8 when the mobile warning triangle 100 is placed on a lane 300 and the second sensor 7 detects a lane marking 200.

In block 702, the first color information detected by the first sensor 6, the second color information detected by the second sensor 7, and the third color information detected by the third sensor 8 are determined whether a color of the lane marking 200.

In block 704, the mobile warning triangle 100 is controlled to continue moving forward when the first color information detected by the first sensor 6 and the third color information detected by the third sensor 8 are not the color of the lane marking 200, and the second color information detected by the second sensor 7 is the color of the lane marking 200.

In block 706, a moving direction of the mobile warning triangle 100 is corrected to a first direction by a first predetermined angle when the first color information detected by the first sensor 6 is not the color of the lane marking 200, and the second color information detected by the second sensor 7 and the third color information detected by the third sensor 8 are both the color of the lane marking 200.

In block 708, the mobile warning triangle 100 is controlled to continue moving forward when the mobile warning triangle 100 is corrected to the first direction and the first color information detected by the first sensor 6 and the third color information detected by the third sensor 8 are not the color of the lane marking 200, and the second color information detected by the second sensor 7 is the color of the lane marking 200.

In block 710, the moving direction of the mobile warning triangle 100 is corrected to a second direction by a second predetermined angle when the third color information detected by the third sensor 8 is not the color of the lane marking 200, and the first color information detected by the first sensor 6 and the second color information detected by the second sensor 7 are both the color of the lane marking 200.

In block 712, the mobile warning triangle 100 is controlled to continue moving forward when the mobile warning triangle 100 is corrected to the second direction and the first color information detected by the first sensor 6 and the third color information detected by the third sensor 8 are not the color of the lane marking 200, and the second color information detected by the second sensor 7 is the color of the lane marking 200.

In block 714, the mobile warning triangle 100 is controlled to stop moving when the first color information detected by the first sensor 6, the second color information detected by the second sensor 7, and the third color information detected by the third sensor 8 are all not the color of the lane marking 200.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A method of controlling a mobile warning triangle, the mobile warning triangle comprising a first sensor, a second sensor, and a third sensor, the second sensor being located between the first sensor and the third sensor, the method comprising:
controlling the mobile warning triangle to move forward and acquiring first color information detected by the first sensor, second color information detected by the second sensor, and third color information detected by the third sensor when the mobile warning triangle is placed on a lane and the first sensor, the second sensor, and the third sensor all detect a lane marking;
determining whether the first color information detected by the first sensor, the second color information detected by the second sensor, and the third color information detected by the third sensor are a color of the lane marking;
controlling the mobile warning triangle to continue moving forward when the first color information detected by the first sensor, the second color information detected by the second sensor, and the third color information detected by the third sensor are all the color of the lane marking;
correcting a moving direction of the mobile warning triangle to a first direction by a first predetermined angle when the first color information detected by the first sensor is not the color of the lane marking, and the second color information detected by the second sensor and the third color information detected by the third sensor are both the color of the lane marking;
controlling the mobile warning triangle to continue moving forward when the mobile warning triangle is corrected to the first direction and the first color information detected by the first sensor, the second color information detected by the second sensor, and the third color information detected by the third sensor are all the color of the lane marking;
correcting the moving direction of the mobile warning triangle to a second direction by a second predetermined angle when the third color information detected by the third sensor is not the color of the lane marking, and the first color information detected by the first sensor and the second color information detected by the second sensor are both the color of the lane marking; and
controlling the mobile warning triangle to continue moving forward when the mobile warning triangle is corrected to the second direction and the first color information detected by the first sensor, the second color information detected by the second sensor, and the third color information detected by the third sensor are all the color of the lane marking.

2. The method of claim 1, wherein the block of correcting the moving direction of the mobile warning triangle to the first direction by the first predetermined angle comprises:
performing a direction correction on the mobile warning triangle to the first direction by the first predetermined angle;
determining whether the first color information detected by the first sensor, the second color information detected by the second sensor, and the third color information detected by the third sensor are all the color of the lane marking during the direction correction of the mobile warning triangle; and
stopping to perform the direction correction on the mobile warning triangle when the first color information detected by the first sensor, the second color information detected by the second sensor, and the third color information detected by the third sensor are all the color of the lane marking.

3. The method of claim 1, wherein the block of correcting the moving direction of the mobile warning triangle to the second direction by the second predetermined angle comprises:
performing a direction correction on the mobile warning triangle to the second direction by the second predetermined angle;
determining whether the first color information detected by the first sensor, the second color information detected by the second sensor, and the third color information detected by the third sensor are all the color of the lane marking during the direction correction of the mobile warning triangle; and
stopping to perform the direction correction on the mobile warning triangle when the first color information detected by the first sensor, the second color information detected by the second sensor, and the third color information detected by the third sensor are all the color of the lane marking.

4. The method of claim 1, wherein the block of correcting the moving direction of the mobile warning triangle to the first direction by the first predetermined angle comprises:
correcting the moving direction of the mobile warning triangle to the first direction by the first predetermined angle at a first angle-correction speed.

5. The method of claim 4, further comprising:
correcting the moving direction of the mobile warning triangle to the first direction by a third predetermined angle at a second angle-correction speed when the first color information detected by the first sensor and the second color information detected by the second sensor are both not the color of the lane marking, and the third color information detected by the third sensor is the color of the lane marking;
wherein the second angle-correction speed is not greater than the first angle-correction speed.

6. The method of claim 1, wherein the block of correcting the moving direction of the mobile warning triangle to the second direction by the second predetermined angle comprises:
correcting the moving direction of the mobile warning triangle to the second direction by the second predetermined angle at a third angle-correction speed.

7. The method of claim 6, further comprising:
correcting the moving direction of the mobile warning triangle to the second direction by a fourth predetermined angle at a fourth angle-correction speed when the first color information detected by the first sensor is the color of the lane marking, and the second color information detected by the second sensor and the third color information detected by the third sensor are both not the color of the lane marking;
wherein the fourth angle-correction speed is not greater than the third angle-correction speed.

8. The method of claim 1, further comprising:
controlling the mobile warning triangle to stop moving when the first color information detected by the first sensor, the second color information detected by the second sensor, and the third color information detected by the third sensor are all not the color of the lane marking.

9. A method of controlling a mobile warning triangle, the mobile warning triangle comprising a first sensor, a second sensor, and a third sensor, the second sensor being located between the first sensor and the third sensor, the method comprising:

controlling the mobile warning triangle to move forward and acquiring first color information detected by the first sensor, second color information detected by the second sensor, and third color information detected by the third sensor when the mobile warning triangle is placed on a lane and the second sensor detects a lane marking;

determining whether the first color information detected by the first sensor, the second color information detected by the second sensor, and the third color information detected by the third sensor are a color of the lane marking;

controlling the mobile warning triangle to continue moving forward when the first color information detected by the first sensor is the color of the lane marking, and the second color information detected by the second sensor and the third color information detected by the third sensor are both not the color of the lane marking;

correcting a moving direction of the mobile warning triangle to a first direction by a first predetermined angle when the first color information detected by the first sensor is not the color of the lane marking, and the second color information detected by the second sensor and the third color information detected by the third sensor are both the color of the lane marking;

controlling the mobile warning triangle to continue moving forward when the mobile warning triangle is corrected to the first direction and the second color information detected by the second sensor is the color of the lane marking, and the first color information detected by the first sensor and the third color information detected by the third sensor are both not the color of the lane marking;

correcting the moving direction of the mobile warning triangle to a second direction by a second predetermined angle when the third color information detected by the third sensor is not the color of the lane marking, and the first color information detected by the first sensor and the second color information detected by the second sensor are both the color of the lane marking; and controlling the mobile warning triangle to continue moving forward when the mobile warning triangle is corrected to the second direction and the second color information detected by the second sensor is the color of the lane marking, and the first color information detected by the first sensor and the third color information detected by the third sensor are both not the color of the lane marking.

10. A mobile warning triangle comprising:
a warning triangle;
at least two wheels;
a first sensor;
a second sensor;
a third sensor;
at least one processor; and
a storage device storing one or more programs which when executed by the at least one processor, causes the at least one processor to:

control the mobile warning triangle to move forward and acquire first color information detected by the first sensor, second color information detected by the second sensor, and third color information detected by the third sensor when the mobile warning triangle is placed on a lane and the first sensor, the second sensor, and the third sensor all detect a lane marking;

determine whether the first color information detected by the first sensor, the second color information detected by the second sensor, and the third color information detected by the third sensor are a color of the lane marking;

control the mobile warning triangle to continue moving forward when the first color information detected by the first sensor, the second color information detected by the second sensor, and the third color information detected by the third sensor are all the color of the lane marking;

correct a moving direction of the mobile warning triangle to a first direction by a first predetermined angle when the first color information detected by the first sensor is not the color of the lane marking, and the second color information detected by the second sensor and the third color information detected by the third sensor are both the color of the lane marking;

control the mobile warning triangle to continue moving forward when the mobile warning triangle is corrected to the first direction and the first color information detected by the first sensor, the second color information detected by the second sensor, and the third color information detected by the third sensor are all the color of the lane marking;

correct the moving direction of the mobile warning triangle to a second direction by a second predetermined angle when the third color information detected by the third sensor is not the color of the lane marking, and the first color information detected by the first sensor and the second color information detected by the second sensor are both the color of the lane marking; and control the mobile warning triangle to continue moving forward when the mobile warning triangle is corrected to the second direction and the first color information detected by the first sensor, the second color information detected by the second sensor, and the third color information detected by the third sensor are all the color of the lane marking.

11. The mobile warning triangle of claim 10, wherein the at least one processor to correct the moving direction of the mobile warning triangle to the first direction by the first predetermined angle comprises:

perform a direction correction on the mobile warning triangle to the first direction by the first predetermined angle;

determine whether the first color information detected by the first sensor, the second color information detected by the second sensor, and the third color information detected by the third sensor are all the color of the lane marking during the direction correction of the mobile warning triangle; and stop to perform the direction correction on the mobile warning triangle when the first color information detected by the first sensor, the second color information detected by the second sensor, and the third color information detected by the third sensor are all the color of the lane marking.

12. The mobile warning triangle of claim 10, wherein the at least one processor to correct the moving direction of the mobile warning triangle to the second direction by the second predetermined angle comprises:
  perform a direction correction on the mobile warning triangle to the second direction by the second predetermined angle;
  determine whether the first color information detected by the first sensor, the second color information detected by the second sensor, and the third color information detected by the third sensor are all the color of the lane marking during the direction correction of the mobile warning triangle; and
  stop to perform the direction correction on the mobile warning triangle when the first color information detected by the first sensor, the second color information detected by the second sensor, and the third color information detected by the third sensor are all the color of the lane marking.

13. The mobile warning triangle of claim 10, wherein the at least one processor to correct the moving direction of the mobile warning triangle to the first direction by the first predetermined angle comprises:
  correct the moving direction of the mobile warning triangle to the first direction by the first predetermined angle at a first angle-correction speed.

14. The mobile warning triangle of claim 13, wherein the at least one processor is further configured to:
  correct the moving direction of the mobile warning triangle to the first direction by a third predetermined angle at a second angle-correction speed when the first color information detected by the first sensor and the second color information detected by the second sensor are both not the color of the lane marking, and the third color information detected by the third sensor is the color of the lane marking;
  wherein the second angle-correction speed is not greater than the first angle-correction speed.

15. The mobile warning triangle of claim 10, wherein the at least one processor to correct the moving direction of the mobile warning triangle to the second direction by the second predetermined angle comprises:
  correct the moving direction of the mobile warning triangle to the second direction by the second predetermined angle at a third angle-correction speed.

16. The mobile warning triangle of claim 15, wherein the at least one processor is further configured to:
  correct the moving direction of the mobile warning triangle to the second direction by a fourth predetermined angle at a fourth angle-correction speed when the first color information detected by the first sensor is the color of the lane marking, and the second color information detected by the second sensor and the third color information detected by the third sensor are both not the color of the lane marking;
  wherein the fourth angle-correction speed is not greater than the third angle-correction speed.

17. The mobile warning triangle of claim 10, wherein the at least one processor is further configured to:
  control the mobile warning triangle to stop moving when the first color information detected by the first sensor, the second color information detected by the second sensor, and the third color information detected by the third sensor are all not the color of the lane marking.

* * * * *